(12) United States Patent
Chen et al.

(10) Patent No.: US 10,489,914 B2
(45) Date of Patent: Nov. 26, 2019

(54) METHOD AND APPARATUS FOR PARSING AND PROCESSING THREE-DIMENSIONAL CAD MODEL

(71) Applicant: BEIHANG UNIVERSITY, Beijing (CN)

(72) Inventors: Xiaowu Chen, Bejing (CN); Xiaogang Wang, Bejing (CN); Bin Zhou, Bejing (CN); Haiyue Fang, Bejing (CN); Qinping Zhao, Bejing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/132,345

(22) Filed: Sep. 14, 2018

(65) Prior Publication Data

US 2019/0087964 A1 Mar. 21, 2019

(30) Foreign Application Priority Data

Sep. 20, 2017 (CN) .......................... 2017 1 0850541

(51) Int. Cl.
| | |
|---|---|
| *G06T 7/143* | (2017.01) |
| *G06N 7/00* | (2006.01) |
| *G06N 3/08* | (2006.01) |
| *G06T 15/08* | (2011.01) |
| *G06K 9/72* | (2006.01) |

(Continued)

(52) U.S. Cl.
CPC ............ *G06T 7/143* (2017.01); *G06K 9/6296* (2013.01); *G06K 9/726* (2013.01); *G06N 3/08* (2013.01); *G06N 7/005* (2013.01); *G06T 15/08* (2013.01); *G06T 17/00* (2013.01); *G06T 2207/20072* (2013.01); *G06T 2207/20076* (2013.01);

(Continued)

(58) Field of Classification Search
None
See application file for complete search history.

(56) References Cited

U.S. PATENT DOCUMENTS 7,031,529 B2 * 4/2006 Lee .................... G06K 9/469
382/149
7,116,825 B2 * 10/2006 Lee .................... G06K 9/6282
382/226

(Continued)

*Primary Examiner* — Michael J Cobb
(74) *Attorney, Agent, or Firm* — J.C. Patents

(57) ABSTRACT

The present application provides a method and an apparatus for parsing and processing a three-dimensional CAD model, where the method includes: determining three kinds of adjacency relation information for each component in the three-dimensional model; performing aggregation processing on all components of the three-dimensional model, and generating three part hypothesis sets for the three-dimensional model; performing voxelization expression processing on each part hypothesis in each part hypothesis set, and generating voxelization information for each part hypothesis; inputting voxelization information of all part hypotheses in each part hypothesis set into an identification model to obtain a confidence score and a semantic category probability distribution for each part hypothesis; and constructing, according to the confidence score and the semantic category probability distribution of each part hypothesis in the part hypothesis sets, a high-order conditional random field model, and obtaining a semantic category analysis result for each component in the three-dimensional model.

10 Claims, 10 Drawing Sheets

(51) Int. Cl.
*G06T 17/00* (2006.01)
*G06K 9/62* (2006.01)

(52) U.S. Cl.
CPC ............... *G06T 2207/20081* (2013.01); *G06T 2207/20084* (2013.01)

(56) References Cited

U.S. PATENT DOCUMENTS

| | | | | |
|---|---|---|---|---|
| 7,133,560 | B2* | 11/2006 | Lee | G06K 9/469 |
| | | | | 382/226 |
| 2011/0264649 | A1* | 10/2011 | Hsiao | G06N 5/022 |
| | | | | 707/722 |
| 2014/0324904 | A1* | 10/2014 | Yamamoto | G06F 16/245 |
| | | | | 707/769 |
| 2017/0161945 | A1* | 6/2017 | Robert | G06T 17/005 |
| 2017/0270361 | A1* | 9/2017 | Puttagunta | G06K 9/00664 |

* cited by examiner

METHOD AND APPARATUS FOR PARSING AND PROCESSING THREE-DIMENSIONAL CAD MODEL

CROSS-REFERENCE TO RELATED APPLICATIONS

This application claims priority to Chinese Patent Application No. 201710850541.7, filed on Sep. 20, 2017, which is hereby incorporated by reference in its entirety.

TECHNICAL FIELD

The present application relates to the field of virtual reality and augmented reality technologies and, in particular, to a method and an apparatus for parsing and processing a three-dimensional model.

BACKGROUND

With the development of computer graphics, virtual reality technology and augmented reality technology, three-dimensional models are more widely used. The three-dimensional model requires to be semantically parsed, that is, it needs to know which semantic category each component in the three-dimensional models is attributable to, where each semantic category is a structural category in the three-dimensional models. For instance, it needs to know components in a three-dimensional vehicle model are attributable to a semantic category for doors or wheel, and so on.

In the prior art, a projection-based three-dimensional model semantic segmentation method is used, where the method proposes a novel Hausdorff distance and matching projected binary images of three-dimensional model based on the novel Hausdorff distance, and the distance takes an internal hole structure of a two-dimensional figures into consideration, which may better sense topological changes and may be applied to piecewise-linearly warped model projections to compensate for scale transformation and view discrepancies.

In the prior art, the projection-based three-dimensional model semantic segmentation method can handle an imperfect three-dimensional model, but cannot analyze a three-dimensional model having an "inner-external" structure, for instance, for internal components in the three-dimensional vehicle model, such as a steering wheel, seats, etc., the method cannot semantically parse and process the three-dimensional model. Therefore, the method in the prior art cannot parse and process the three-dimensional model having the "internal-external" structure with respect to its semantic category, and thus parsing and identification effects are poor.

SUMMARY

The present application provides a method and an apparatus for parsing and processing a three-dimensional CAD model, which are used to solve a problem in the prior art that parsing and identification effects are poor due to incapability of parsing and processing a three-dimensional model having an "internal-external" structure with respect to its semantic categories.

In an aspect, the present application provides a method for parsing and processing a three-dimensional model, including:

determining three kinds of adjacency relation information for each component in the three-dimensional model, where the three kinds of adjacency relation information are respectively a center distance between each component and an adjacent component, a sum of volumes of each component and an adjacent component, and a contact area between each component and an adjacent component;

performing aggregation processing on all components of the three-dimensional model according to each kind of adjacency relation information respectively to generate three part hypothesis sets for the three-dimensional model, where each of the part hypothesis sets includes at least one part hypothesis;

for each part hypothesis set, performing voxelization expression processing on each part hypothesis in the part hypothesis set, and generating voxelization information for each part hypothesis, where the voxelization information includes local expression information, global expression information and remaining expression information;

for each part hypothesis set, inputting voxelization information of all part hypotheses in the part hypothesis set into an identification model, and obtaining a confidence score and a semantic category probability distribution for each part hypothesis, where the confidence score characterizes similarity information that the part hypothesis is similar with each semantic part, and the semantic category probability distribution characterizes a probability that the part hypothesis is attributable to each semantic part; and constructing, according to the confidence score and the semantic category probability distribution of each part hypothesis in the three part hypothesis sets, a high-order conditional random field model, and obtaining a semantic category analysis result for each component in the three-dimensional model.

In another aspect, the present application provides an apparatus for parsing and processing a three-dimensional model, including:

a determining module, configured to determine three kinds of adjacency relation information for each component in the three-dimensional model, where the three kinds of adjacency relation information are respectively a center distance between each component and an adjacent component, a sum of volumes of each component and an adjacent component, and a contact area between each component and an adjacent component;

an aggregating module, configured to perform aggregation processing on all components of the three-dimensional model according to each kind of adjacency relation information respectively to generate three part hypothesis sets for the three-dimensional model, where each of the part hypothesis sets includes at least one part hypothesis;

a processing module, configured to, for each part hypothesis set, perform voxelization expression processing on each part hypothesis in the part hypothesis set, and generate voxelization information for each part hypothesis, where the voxelization information includes local expression information, global expression information and remaining expression information;

an analyzing module, configured to: for each part hypothesis set, input voxelization information of all part hypotheses in the part hypothesis set into an identification model, and obtain a confidence score and a semantic category probability distribution for each part hypothesis, where the confidence score characterizes similarity information that the part hypothesis is similar with each semantic part, and the semantic category probability distribution characterizes a probability that the part hypothesis is attributable to each semantic part; and a constructing module, configured to construct, according to the confidence score and the semantic category probability distribution of each part hypothesis in the three part hypothesis sets, a high-order conditional random field model, and obtain a semantic category analysis result for each component in the three-dimensional model.

According to the present application perform aggregation processing on all components of a three-dimensional model via an adjacency relation information between components in the three-dimensional model to generate three part hypothesis sets for the three-dimensional model; then, input voxelization information of all part hypotheses in the part hypothesis sets into a well-trained unified multi-scale convolutional neural network to obtain a confidence score and a semantic category probability distribution of each part hypothesis; and finally, obtain a semantic category analysis result for each component by using a high-order conditional random field model. Therefore, a new method for semantically parsing a three-dimensional CAD model is provided, which can parse and process a three-dimensional model having an "inner-external" structure with respect to its semantic category and has a good parsing effect. This method has strong robustness, which will not be affected by a topological structure of the model, pose change or the like. Moreover, the method provided in the present embodiment is simple and effective, which does not require an interactive operation with a user but has a fast calculation speed.

DESCRIPTION OF EMBODIMENTS

Figure 1:
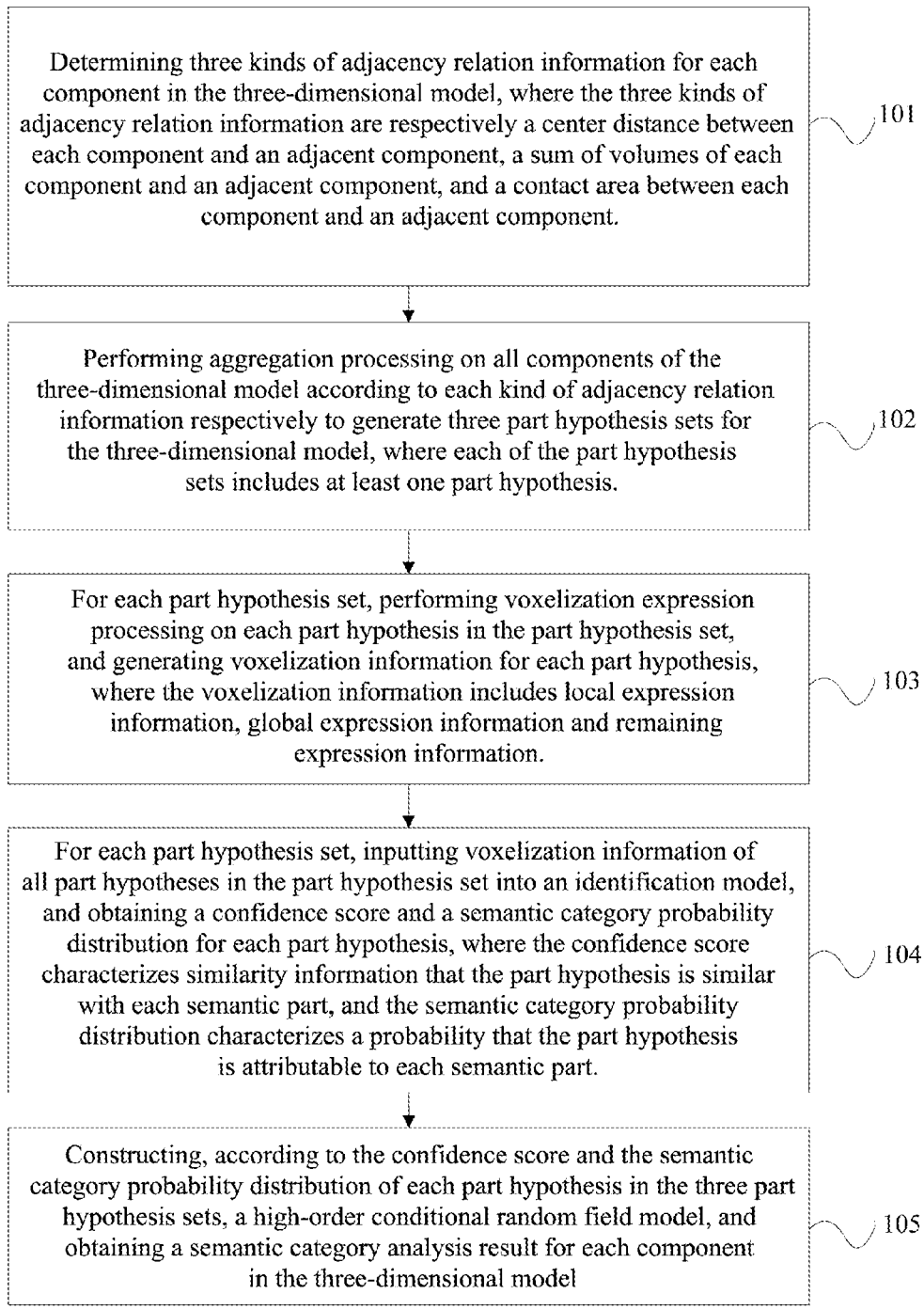
FIG. 1 is a flowchart of a method for parsing and processing a three-dimensional model according to a first embodiment of the present application.

In order to make objectives, technical solutions, and advantages of embodiments of the present application clearer, the technical solutions in the embodiments of the present application will be described hereunder clearly and completely with reference to accompanying drawings in the embodiments of the present application. Obviously, the embodiments described hereunder are only a part of embodiments of the present application, rather than all embodiments of the present application.

Research status of semantic parsing of a three-dimensional model in the prior art will be introduced firstly. The semantic parsing of the three-dimensional model is one of the basic problems in the field of computer graphics. The semantic parsing of the three-dimensional model plays an important role in applications such as model modeling, model editing and model retrieval.

In earlier studies, the semantic parsing is performed on a three-dimensional surface model mainly using a traditional geometric feature, where the geometric feature includes, for instance, curvature, principal component analysis (Principal Component Analysis, PCA for short), a model diameter function, an average geodesic distance, a shape context, a rotated image and the like. The above geometric features may be obtained by performing calculations on a triangular patch of a closed three-dimensional surface model, however, for a three-dimensional computer aided design (Computer Aided Design, CAD for short) model, due to characteristics such as irregularities and uneven distributions of patches in the three-dimensional CAD model, the above geometric features will often become invalid.

In 2015, for semantically parsing a three-dimensional surface model, a compact expression of a traditional feature was achieved via non-linear combination and hierarchical compression of several traditional geometric features by using a deep neural network. The model is semantically parsed by using such a more robust expression form, and a better parsing result is obtained.

In 2017, Stanford University proposed a method of a Sync Spec convolutional neural network (Convolutional Neural Network, CNN for short) for performing semantic parsing of a three-dimensional model. This method mainly uses the CNN to train a vertex function, and performs spectral analysis on the three-dimensional model by using local information of the three-dimensional model, shares kernel weights, and then performs semantic parsing on the three-dimensional model.

In 2017, the University of Massachusetts Amherst proposed a depth architecture-based method for semantic segmentation of a model in combination with a multi-view fully convolutional neural network and a conditional random fields (Conditional random fields, CRF for short) model. The method is essentially an image-based segmentation method. This type of method also includes other studies. For instance, in 2013, Shenzhen Institutes of Advanced Technology of the Chinese Academy of Sciences also proposed a projection-based semantic segmentation method for a three-dimensional model.

In 2017, Stanford University designed a novel neural network Point Net that can semantically mark unordered point clouds; however, this method does not take a cross relation between components in the three-dimensional model into consideration, for instance, across over between a gear and a chain in the three-dimensional CAD model cannot be conceived, and thus it is impossible to perform accurate semantic parsing.

In the meantime, in recent years, there are many unsupervised or semi-supervised methods for semantically parsing a three-dimensional model. In order to reduce computational overheads, this type of method is used to: first perform over-segmentation on a single three-dimensional surface model; generate a large number of super-patches; then extract, for each super-patch, a set of high-dimensional feature expressions via a traditional method; and eventually, obtain a final semantically marked result in a clustering or aggregation manner to obtain the semantically marked result.

The semantic parsing methods described above have problems such as poor parsing effects and incapability of parsing and processing a three-dimensional model having an "internal-external" structure with respect to its semantic category. Thus, a solution in the present application is proposed.

FIG. 1 is a flowchart of a method for parsing and processing a three-dimensional model according to a first embodiment of the present application. As shown in FIG. 1, the method in the present embodiment includes:

Step 101: determining three kinds of adjacency relation information for each component in the three-dimensional model, where the three kinds of adjacency relation information are respectively a center distance between each component and an adjacent component, a sum of volumes of each component and an adjacent component, and a contact area between each component and an adjacent component.

In the present embodiment, specifically, a three-dimensional model to be analyzed is obtained, where the three-dimensional model is a three-dimensional CAD model. Then, for each component in the three-dimensional model, analyze three different kinds of adjacency relation information between a component and an adjacent component, where the three kinds of adjacency relation information are respectively a center distance between a component and an adjacent component, a sum of volumes of a component and an adjacent component, and a contact area between a component and an adjacent component. In addition, the three different kinds of adjacency relation information are aggregation strategies for aggregation processing in Step 102.

Step 102: performing aggregation processing on all components of the three-dimensional model according to each kind of adjacency relation information respectively to generate three part hypothesis sets for the three-dimensional model, where each of the part hypothesis sets includes at least one part hypothesis.

In the present embodiment, specifically, the three different kinds of adjacency relation information in Step 101 are used as three different aggregation strategies to perform aggregation processing on all components of the three-dimensional model respectively, and thus three part hypothesis sets are obtained. The aggregation processing method used in the present application is a greedy bottom-up hierarchical aggregation strategy, which extracts a large number of multi-level part hypotheses via constraints of each aggregation strategy. For each aggregation strategy, hierarchical sampling may be represented as a binary tree, where each leaf node represents each of components in the three-dimensional CAD model, and all parent nodes are part hypotheses generated during the aggregation processing procedure. An initial stage of the aggregation processing method is all components in the three-dimensional CAD model. An aggregation operation is performed iteratively, during each of the iterations, adjacent nodes with a minimum measurement are aggregated into a new node, that is, a part hypothesis is obtained, and the aggregation processing method end still the three-dimensional CAD model integrally forms a root node. The measurement herein is calculated through the aggregation strategies.

Figure 2:
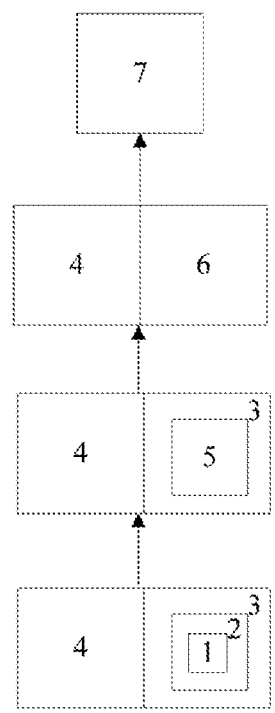
FIG. 2 is a first schematic diagram of an aggregation processing procedure of the method for parsing and processing the three-dimensional model according to the first embodiment of the present application.

Specifically, adjacency relation information about a center distance between each component and an adjacent component may be used to perform aggregation processing on all components in the three-dimensional model, thus two components with a closer center distance have a priority to be aggregated, such as concentric components, and finally a part hypothesis set is obtained. For instance, FIG. 2 is a first schematic diagram of an aggregation processing procedure of the method for parsing and processing the three-dimensional model according to the first embodiment of the present application. As shown in FIG. 2, a three-dimensional model has a component 1, a component 2, a component 3 and a component 4. Adjacency relation information about a center distance between each component and an adjacent component is used to perform aggregation processing on all components of the three-dimensional model. First, the component 1 and the component 2 have the closest center distance, then the component 1 and the component 2 are aggregated to obtain apart hypothesis 5; then, the component 3 and the part hypothesis 5 have the closest center distance, then the component 3 and the part hypothesis 5 are aggregated to obtain a part hypothesis 6; then, the component 4 and the part hypothesis 6 have the closest center distance, then the component 4 and the part hypothesis 6 are aggregated to obtain a part hypothesis 7.

Figure 3:
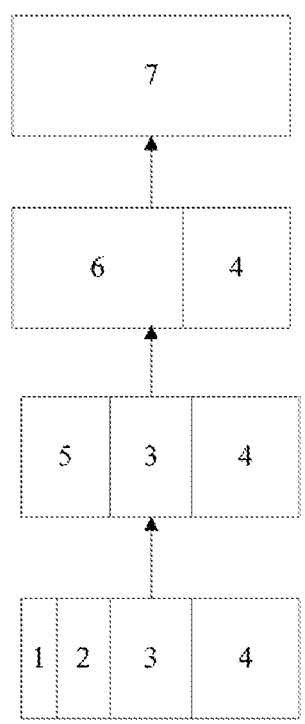
FIG. 3 is a second schematic diagram of an aggregation processing procedure of the method for parsing and processing the three-dimensional model according to the first embodiment of the present application.

Adjacency relation information about a sum of volumes of each component and an adjacent component may be used to perform aggregation processing on all components of the three-dimensional model, thus the two adjacent components with a smaller sum of volumes have a priority to be aggregated. This strategy is very effective for a three-dimensional model where a semantic part consists of a large number of small components, such as bicycle chains, and finally a part hypothesis set may be obtained. For instance, FIG. 3 is a second schematic diagram of an aggregation processing procedure of the method for parsing and processing the three-dimensional model according to the first embodiment of the present application. As shown in FIG. 3, a three-dimensional model has a component 1, a component 2, a component 3 and a component 4. Adjacency relation information about a sum of volumes of each component and an adjacent component is used to perform aggregation processing on all components of the three-dimensional model. First, the component 1 and the component 2 have the minimum sum of volumes, then the component 1 and the component 2 are aggregated to obtain apart hypothesis 5; then, the component 3 and the part hypothesis 5 have the minimum sum of volumes, then the component 3 and the part hypothesis 5 are aggregated to obtain a part hypothesis 6; then, the component 4 and the part hypothesis 6 have the minimum sum of volumes, then the component 4 and the part hypothesis 6 are aggregated to obtain a part hypothesis 7.

Figure 4:
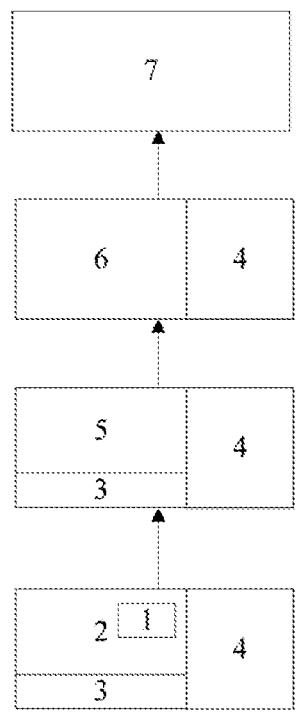
FIG. 4 is a third schematic diagram of an aggregation processing procedure of the method for parsing and processing the three-dimensional model according to the first embodiment of the present application.

Adjacency relation information about a contact area between each component and an adjacent component may be used to perform aggregation processing on all components of the three-dimensional model, thus the two adjacent components with a larger contact area have a priority to be aggregated, that is, the two adjacent components with a higher degree of connectedness and compactness are encouraged to be aggregated first, such as a mechanical unit and an auxiliary attachment, and finally a part hypothesis set may be obtained. For instance, FIG. 4 is a third schematic diagram of an aggregation processing procedure of the method for parsing and processing the three-dimensional model according to the first embodiment of the present application. As shown in FIG. 4, a three-dimensional model has a component 1, a component 2, a component 3 and a component 4. Adjacency relation information about a contact area between each component and an adjacent component is used to perform aggregation processing on all components of the three-dimensional model. First, the component 1 and the component 2 have the largest contact area, then the component 1 and the component 2 are aggregated to obtain apart hypothesis 5; then, the component 3 and the part hypothesis 5 have the largest contact area, then the component 3 and the part hypothesis 5 are aggregated to obtain a part hypothesis 6; then, the component 4 and the part hypothesis 6 have the largest contact area, then the component 4 and the part hypothesis 6 are aggregated to obtain a part hypothesis 7.

Therefore, a structural connectedness and an adjacency relation between components of the three-dimensional CAD model may be obtained according to the three aggregation strategies determined from a priori rules for assembly of the three-dimensional CAD model.

Step 103: for each part hypothesis set, performing voxelization expression processing on each part hypothesis in the part hypothesis set, and generating voxelization information for each part hypothesis, where the voxelization information includes local expression information, global expression information and remaining expression information.

In the present embodiment, specifically, for each part hypothesis set, the following process is performed: perform voxelization expression processing on each part hypothesis in the part hypothesis set, and generate voxelization information for each part hypothesis. That is, each part hypothesis is expressed by three kinds of voxelization.

The voxelization information includes: local expression information characterizing a local detail feature of the part hypothesis; global expression information characterizing features of a relative position, a relative size and a rough structure of the part hypothesis relative to the integral three-dimensional model; and remaining expression information characterizing global contextual information of the part hypothesis in the integral three-dimensional model. Moreover, in order to facilitate calculations, calculating procedures for the voxelization information are completed in voxel space of 30*30*30.

Step 104: for each part hypothesis set, inputting voxelization information of all part hypotheses in the part hypothesis set into an identification model, and obtaining a confidence score and a semantic category probability distribution for each part hypothesis, where the confidence score characterizes similarity information that the part hypothesis is similar with each semantic part, and the semantic category probability distribution characterizes a probability that the part hypothesis is attributable to each semantic part.

In the present embodiment, specifically, a three-dimensional model for which semantic categories have been divided is used as a training set, and the training set is input into an identification model, where the identification model uses a unified multi-scale convolutional neural network to obtain a well-trained identification model.

Then, for each part hypothesis set in Step 103, input voxelization information of all part hypotheses in the part hypothesis set into the well-trained unified multi-scale convolutional neural network to identify each part hypothesis and obtain a confidence score (Confidence Score) and a semantic category (Semantic Categories) probability distribution for each part hypothesis; where the confidence score of each part hypothesis characterizes similarity information that the part hypothesis is similar to each semantic part, that is, how much this part hypothesis is similar to a semantic part, for instance, take a three-dimensional vehicle model as an example, a certain part hypothesis is similar to a steering wheel or a tire; the semantic category probability distribution of each part hypothesis characterizes a probability that the part hypothesis is attributable to each semantic part, that is, which semantic part this part hypothesis is similar to, for instance, take a three-dimensional vehicle model as an example, a certain part hypothesis is more similar to a steering wheel or more similar to a tire.

Figure 5:
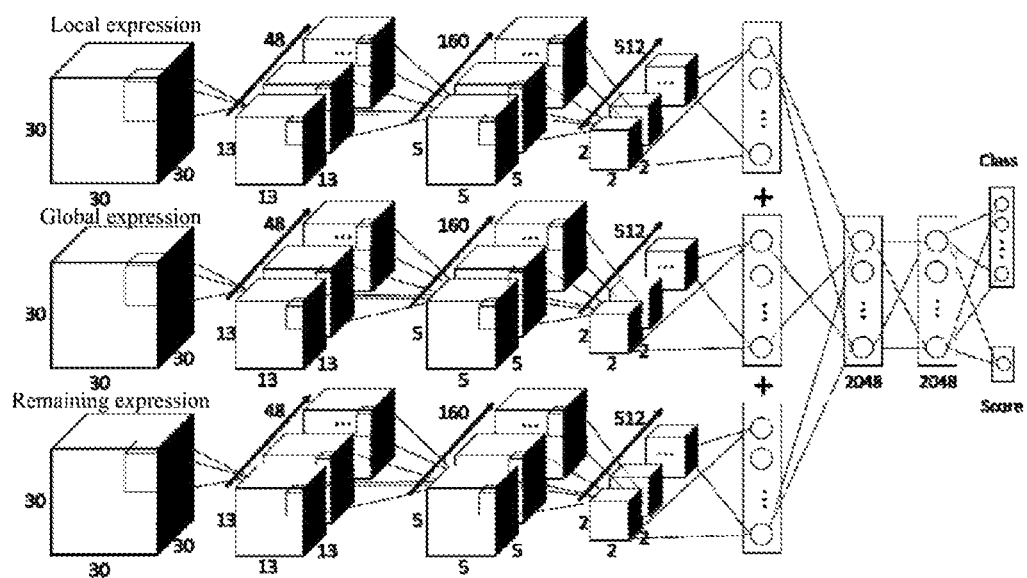
FIG. 5 is a schematic diagram of a unified multi-scale convolutional neural network for the method for parsing and processing the three-dimensional model according to the first embodiment of the present application.

Specifically, in a case where three part hypothesis sets are generated, for each part hypothesis set, treat three kinds of voxelization expressions of the part hypothesis in the part hypothesis set as an input of the neural network, where the three kinds of voxelization expressions include local expression information, global expression information, and remaining expression information. Then, for each part hypothesis set, FIG. 5 is a schematic diagram of a unified multi-scale convolutional neural network for the method for parsing and processing the three-dimensional model according to the first embodiment of the present application. As shown in FIG. 5, three kinds of voxelization expressions of the part hypothesis in the part hypothesis set are input into a unified multi-scale convolutional neural network, since the neural network architecture of FIG. 5 is mainly composed of three branches, the local expression information, the global expression information and the remaining expression information may be input into the three branches respectively, i.e. the upper, the middle and the lower; then, features formed from convolutions of the three branches are combined into a high-dimensional vector which is subsequently input into a fully-connected layer to be reduced to a 2048-dimension; finally, a fully-connected layer uses the 2048-dimensional vector as an input, ending up with a confidence score 'Score' and a semantic category probability distribution 'Class' obtained via calculations.

Step 105: constructing, according to the confidence score and the semantic category probability distribution of each part hypothesis in the three part hypothesis sets, a high-order conditional random field model, and obtaining a semantic category analysis result for each component in the three-dimensional model.

Figure 6:
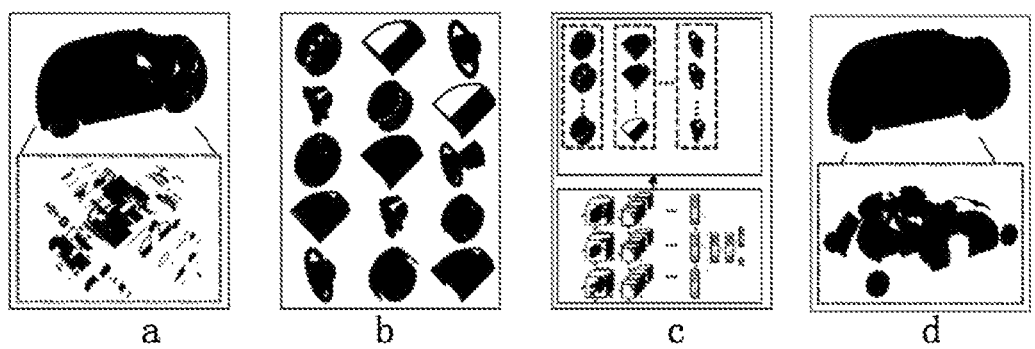
FIG. 6 is a schematic diagram of a processing procedure of the three-dimensional model according to the first embodiment of the present application.

In the present embodiment, specifically, construct a high-order conditional random field model according to the confidence score and the semantic category probability distribution of each part hypothesis in the three part hypothesis sets; then, comprehensively educe an optimal semantic category of each component; and finally obtain a semantic category analysis result for each component in the three-dimensional model, where the semantic category analysis result characterizes to which semantic category the component is attributable. FIG. 6 is a schematic diagram of a processing procedure of the three-dimensional model according to the first embodiment of the present application. As shown in FIG. 6, section a of FIG. 6 is a three-dimensional model into which an automobile is input; section b of FIG. 6 characterizes various part hypotheses; section c of FIG. 6, is a process where Steps 101-105 are proceeded; and section d of FIG. 6 is a graphic display manner, which shows semantic category analysis results for each component, and the components that are attributable to the same semantic category may be given with the same color.

According to the present embodiment, perform aggregation processing on all components of a three-dimensional model via information about an adjacency relation between components in the three-dimensional model to generate three part hypothesis sets for the three-dimensional model; then, input voxelization information of all part hypotheses in the part hypothesis sets into a well-trained unified multi-scale convolutional neural network to obtain a confidence score and a semantic category probability distribution of each part hypothesis; and finally, obtain a semantic category analysis result for each part by using a high-order conditional random field model. Therefore, a new method for semantically parsing a three-dimensional CAD model is provided, which can parse and process a three-dimensional model having an "inner-external" structure with respect to its semantic category and has a good parsing effect. This method has strong robustness, which will not be affected by a topological structure of the model, a pose change or the like. Moreover, the method provided in the present embodiment is simple and effective, which does not require an interactive operation with a user but has a fast calculation speed.

Figure 7:
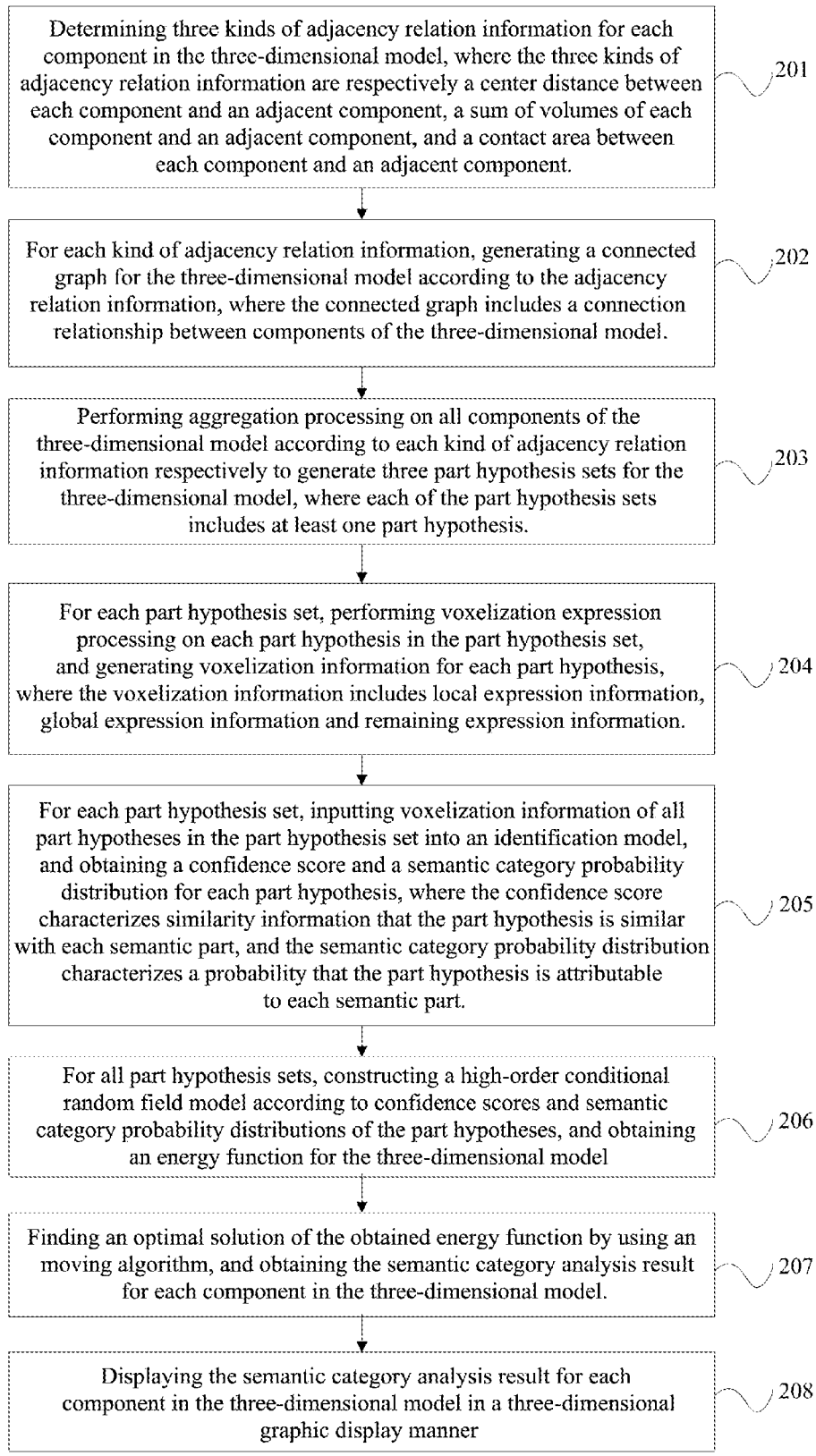
FIG. 7 is a flowchart of a method for parsing and processing a three-dimensional model according to a second embodiment of the present application.

FIG. 7 is a flowchart of a method for parsing and processing a three-dimensional model according to a second embodiment of the present application. As shown in FIG. 7, the method in the present embodiment includes:

Step 201: determining three kinds of adjacency relation information for each component in the three-dimensional model, where the three kinds of adjacency relation information are respectively a center distance between each component and an adjacent component, a sum of volumes of each component and an adjacent component, and a contact area between each component and an adjacent component.

In the present embodiment, specifically, reference may be made to Step 101 of FIG. 1 for the present step, and details will not be repeated herein.

Step 202: for each kind of adjacency relation information, generating a connected graph for the three-dimensional model according to the adjacency relation information, where the connected graph includes a connection relationship between components of the three-dimensional model.

In the present embodiment, specifically, after each kind of adjacency relation information is determined, a connected graph may be generated according to an adjacency relationship between components. This facilitates clustering sampling of the three-dimensional CAD model with respect to its part hypothesis and final construction of the high-order conditional random field. In order to accurately establish the connection relationship between the components of the three-dimensional CAD model in the connected graph, the components of the three-dimensional CAD model may be represented using a voxel expression of 200*200*200. If the components have a cross in voxel space, they are treated as connected, otherwise not.

Step 203: performing aggregation processing on all components of the three-dimensional model according to each kind of adjacency relation information respectively to generate three part hypothesis sets for the three-dimensional model, where each of the part hypothesis sets includes at least one part hypothesis.

In the present embodiment, specifically, reference may be made to Step 102 of FIG. 1 for the present step, and details will not be repeated herein.

Step 204: for each part hypothesis set, performing voxelization expression processing on each part hypothesis in the part hypothesis set, and generating voxelization information for each part hypothesis, where the voxelization information includes local expression information, global expression information and remaining expression information.

In the present embodiment, specifically, reference may be made to Step 103 of FIG. 1 for the present step, and details will not be repeated herein.

Step 205: for each part hypothesis set, inputting voxelization information of all part hypotheses in the part hypothesis set into an identification model, and obtaining a confidence score and a semantic category probability distribution for each part hypothesis, where the confidence score characterizes similarity information that the part hypothesis is similar with each semantic part, and the semantic category probability distribution characterizes a probability that the part hypothesis is attributable to each semantic part.

In the present embodiment, specifically, reference may be made to Step 104 of FIG. 1 for the present step, and details will not be repeated herein.

Step 206: for all part hypothesis sets, constructing a high-order conditional random field model according to confidence scores and semantic category probability distributions of the part hypotheses, and obtaining an energy function for the three-dimensional model, where:

the energy function is $$E(L) = \sum_{i=1}^{N} \varphi_i(x_i) + \lambda \sum_{h=1}^{H} \psi_h(h),$$

where $\varphi_i(x_i)$ is a data item, $\psi_h(h)$ is a high-order consistency item, $\lambda$ is used to tune the importance of $\varphi_i(x_i)$ and $\psi_h(h)$, $\lambda \in [0,1]$, N is a total number of all components of the three-dimensional model, H is a total number of all part hypotheses in all part hypothesis sets of the three-dimensional model, $i \in [1,N]$, $h \in [1,H]$, h, N and H are positive integers, $x_i$ is a random variable associated with the $i^{th}$ component;

$$\varphi_i(x_i) = -\log p(x_i, l_k),$$

$$p(x_i, l_k) = \left(\sum_{j=1}^{N} \exp(w_{ij} s_{ij} d_{ij,k})\right) \bigg/ \left(\sum_{k=1}^{K} \sum_{j=1}^{N} \exp(w_{ij} s_{ij} d_{ij,k})\right),$$

$d_{ij,k}$ is a probability value that the $y_j^{th}$ part hypothesis takes the semantic category $l_k$, $s_{ij}$ is a confidence score of the $y_j^{th}$ part hypothesis, $w_{ij}$ is a ratio of a volume size of the $i^{th}$ component to a volume size of each part hypothesis, and K is a total number of semantic categories in a preset semantic category set, where the semantic category set is L= $\{l_1, \ldots, l_k, \ldots, l_K\}$, $j \in [1,N]$, $k \in [1,K]$, $y_j \in [1,H]$, j, k, K and $y_j$ are positive integers;

$$\psi_h(h) = \begin{cases} N(x_h) \frac{1}{Q} \gamma_{max} & N(x_h) \le Q \\ \gamma_{max} & N(x_h) > Q \end{cases}, N(x_h) = \min_k (|h| - n_k(x_h)),$$

$|h|$ is the number of components included in the $h^{th}$ part hypothesis, $n_k(x_h)$ is the number of components in the $h^{th}$ part hypothesis that are attributable to the semantic category $l_k$, Q is a preset truncation parameter, $\gamma_{max}=\exp(-1/|h|(\theta_1+\theta_2 G(h)))$, $\theta_1$ and $\theta_2$ are parameters set by a cross-validation, G(h) is a semantic category purity of the h part hypotheses, and $$G(y_j) = -\sum_{k=1}^{K} d_{ij,k} \ln d_{ij,k}.$$

In the present embodiment, specifically, for each component, by searching all part hypotheses including this component, educe a semantic category probability distribution of a current component according to respective confidence scores and semantic category probability distributions of all part hypotheses including this component, and generate a data item for the high-order conditional random field; then, calculate a purity for each part hypothesis attributable to the same semantic category according to entropy of its semantic category probability distribution. The smaller the entropy, the more likely all components in the current part hypothesis attributable to the same semantic category. Thus, consistency of semantic categories between adjacent components is defined based on this, and a high-order consistency item is constructed.

Specifically, given that a three-dimensional CAD model includes a plurality of components, a total number of all components of the three-dimensional model is N, each component i is associated with a random variable $x_i$, where $x_i \in X$, and X is a set of random variables; for each part hypothesis set, construct a high-order conditional random field model according to the confidence score and the semantic category probability distribution of the part hypothesis, and then an energy function $$E(L) = \sum_{i=1}^{N} \varphi_i(x_i) + \lambda \sum_{h=1}^{H} \psi_h(h)$$

for the three-dimensional model may be obtained, where:
$\varphi_i(x_i)$ is a data item; $\psi_h(h)$ is a high-order consistency item; $\psi_h(h)$ indicates that semantic categories of the components that are attributable to the same part hypothesis tend to be consistent; and H is a total number of all part hypotheses in all part hypothesis sets of the three-dimensional model.

The data item $\varphi_i(x_i)$ is defined as $\varphi_i(x_i)=-\log p(x_i,l_k)$, where $p(x_i,l_k)$ characterizes a probability that the semantic category of the $i^{th}$ component is $l_k$, and $$p(x_i, l_k) = \left(\sum_{j=1}^{N} \exp(w_{ij} s_{ij} d_{ij,k})\right) / \left(\sum_{k=1}^{K}\sum_{j=1}^{N} \exp(w_{ij} s_{ij} d_{ij,k})\right),$$

where $d_{ij,k}$ is a probability value that the $y_j^{th}$ part hypothesis takes the semantic category $l_k$, $s_{ij}$ is a confidence score of the $y_j^{th}$ part hypothesis, $w_{ij}$ is a ratio of a volume size of the $i^{th}$ component to a volume size of each part hypothesis, and K is a total number of semantic categories in a preset semantic category set, where the semantic category set is L= $\{l_1, \ldots, l_k \ldots, l_K\}$.

The high-order consistency item $\psi_h(h)$ indicates that semantic categories of the components in the same part hypothesis tend to be consistent, meanwhile, the higher the purity of the part hypothesis, the greater the likelihood; according to this, the high-order consistency item $\psi_k(h)$ is thus defined as $$\psi_h(h) = \begin{cases} N(x_h)\frac{1}{Q}\gamma_{max} & N(x_h) \leq Q \\ \gamma_{max} & N(x_h) > Q \end{cases},$$

where |h| is the number of components included in the $h^{th}$ part hypothesis; $n_k(x_h)$ is the number of components in the $h^{th}$ part hypothesis that are attributable to the semantic category $l_k$; Q is a preset truncation parameter which controls stiffness of the higher-order item, and Q may be set to 0.2*|h|, that is, in the current part hypothesis, semantic categories of up to 20% of components are not consistent with semantic categories of other components; $\gamma_{max}=\exp(-1/|h|(\theta_1+\theta_2 G(h)))$, where $\theta_1$ and $\theta_2$ parameters set by a cross-validation, G(h) is a semantic category purity of the h part hypotheses, $$G(y_j) = -\sum_{k=1}^{K} d_{ij,k} \ln d_{ij,k},$$

and G(h) may be obtained by calculating entropy of semantic category distributions of the part hypotheses.

Figure 8:
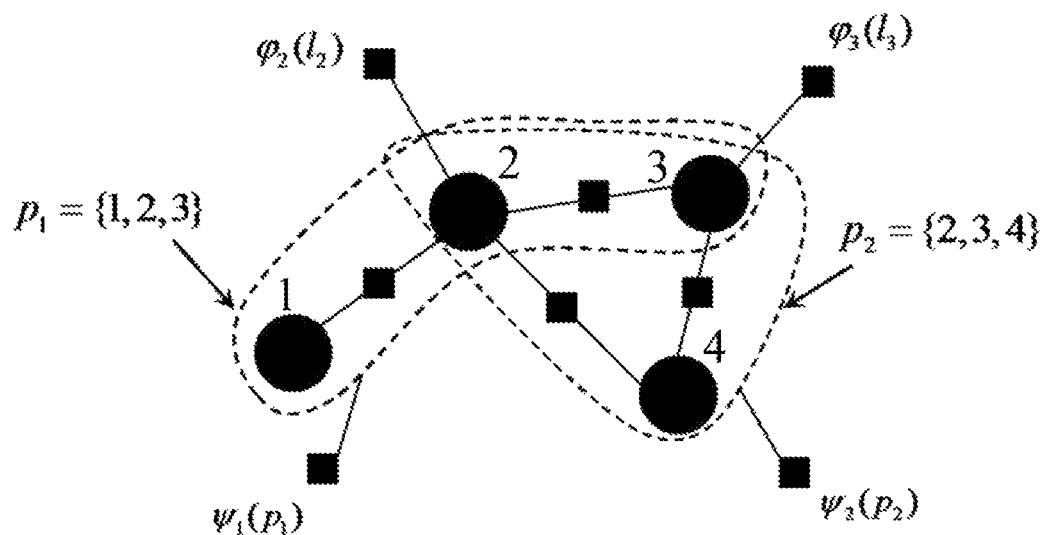
FIG. 8 is a schematic diagram of a high-order conditional random field for the method for parsing and processing the three-dimensional model according to the second embodiment of the present application.

For instance, FIG. 8 is a schematic diagram of a high-order conditional random field for the method for parsing and processing the three-dimensional model according to the second embodiment of the present application. As shown in FIG. 8, the high-order conditional random field may be constructed for the part hypothesis 1, the part hypothesis 2, the part hypothesis 3 and the part hypothesis 4 by using data items in FIG. 8.

Step 207: finding an optimal solution of the obtained energy function by using an α-β moving algorithm, and obtaining the semantic category analysis result for each component in the three-dimensional model.

In the present embodiment, specifically, optimize the obtained energy function by using an α-β moving algorithm finally, and obtain the final semantic category analysis result for components in the three-dimensional CAD model.

Step 208: displaying the semantic category analysis result for each component in the three-dimensional model in a three-dimensional graphic display manner.

Figure 9:
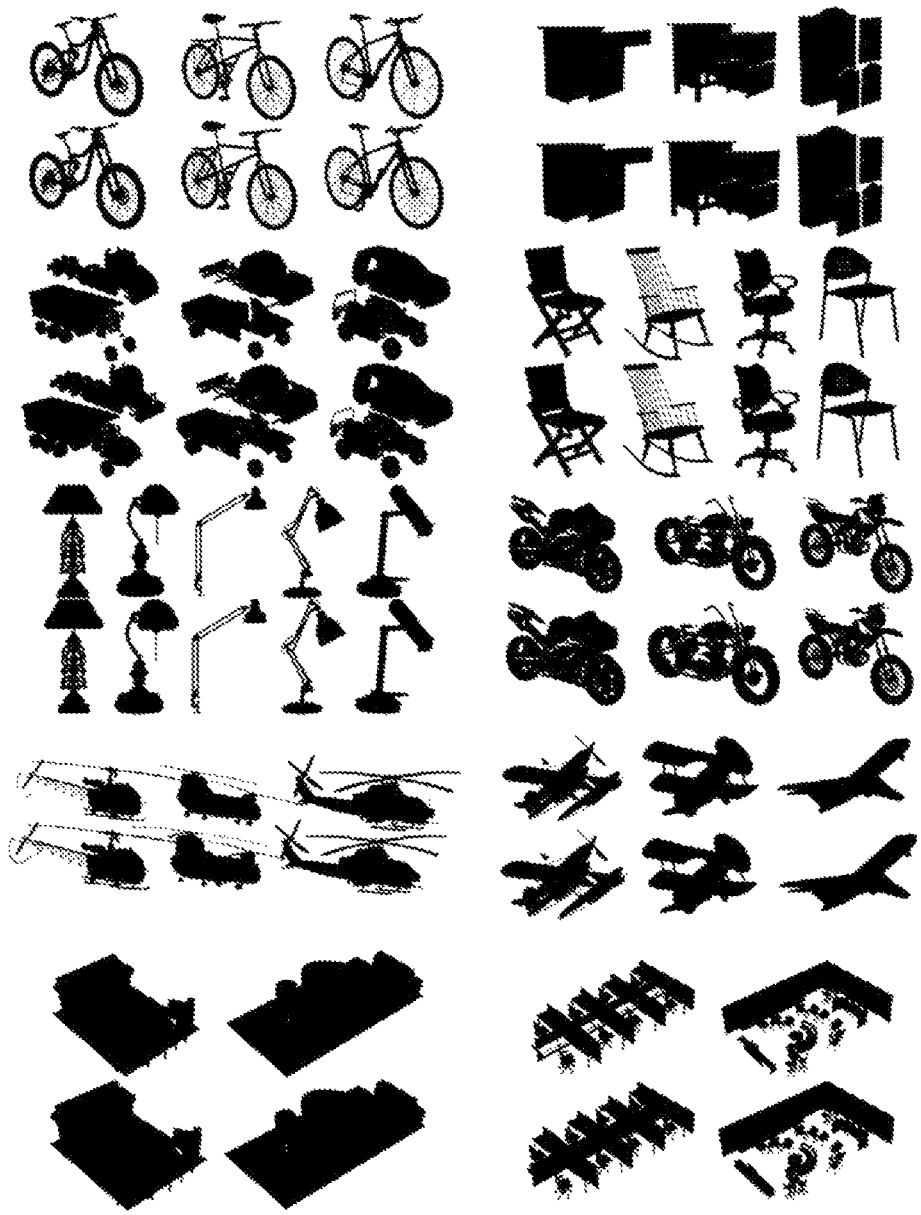
FIG. 9 is a schematic diagram of a three-dimensional model for the method for parsing and processing the three-dimensional model according to the second embodiment of the present application.

In the present embodiment, specifically, after the semantic category analysis result for each component in the three-dimensional model is obtained, the semantic category analysis result for each component is displayed in a three-dimensional graphic display manner; for instance, the components attributable to the same semantic category are given with the same identifier, such as with the same color. FIG. 9 is a schematic diagram of three-dimensional models for the method for parsing and processing the three-dimensional model according to the second embodiment of the present application. As shown in FIG. 9, each of the three-dimensional models in FIG. 9 may be parsed and processed by using the method in the present embodiment.

According to the present embodiment, perform aggregation processing on all components of a three-dimensional model via information about an adjacency relation between components in the three-dimensional model to generate three part hypothesis sets for the three-dimensional model;

then, input voxelization information of all part hypotheses in the part hypothesis sets into a well-trained unified multi-scale convolutional neural network to obtain a confidence score and a semantic category probability distribution of each part hypothesis; and finally, obtain a semantic category analysis result for each component by using a high-order conditional random field model. Therefore, a new method for semantically parsing a three-dimensional CAD model is provided, which can parse and process a three-dimensional model having an "inner-external" structure with respect to its semantic category and has a good parsing effect. This method has strong robustness, which will not be affected by a topological structure of the model, a pose change or the like. Moreover, the method provided in the present embodiment is simple and effective, which does not require an interactive operation with a user but has a fast calculation speed. Furthermore, the sematic category analysis result for each component in the three-dimensional model may be displayed by using a three-dimensional graphic display manner, which thus facilitates the user to learn the parsing result.

Figure 10:
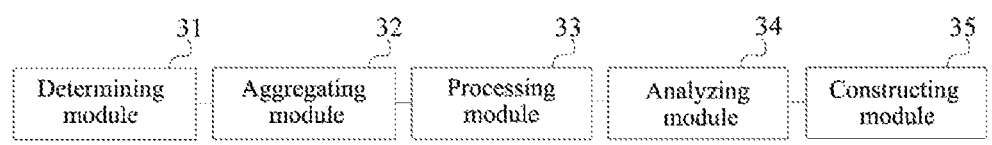
FIG. 10 is a schematic structural diagram of an apparatus for parsing and processing a three-dimensional model according to a third embodiment of the present application.

FIG. 10 is a schematic structural diagram of an apparatus for parsing and processing a three-dimensional model according to a third embodiment of the present application. As shown in FIG. 10, the apparatus provided in the present embodiment includes:

a determining module 31, configured to determine three kinds of adjacency relation information for each component in the three-dimensional model, where the three kinds of adjacency relation information are respectively a center distance between each component and an adjacent component, a sum of volumes of each component and an adjacent component, and a contact area between each component and an adjacent component;

an aggregating module 32, configured to perform aggregation processing on all components of the three-dimensional model according to each kind of adjacency relation information respectively to generate three part hypothesis sets for the three-dimensional model, where each of the part hypothesis sets includes at least one part hypothesis;

a processing module 33, configured to, for each part hypothesis set, perform voxelization expression processing on each part hypothesis in the part hypothesis set, and generate voxelization information for each part hypothesis, where the voxelization information includes local expression information, global expression information and remaining expression information;

an analyzing module 34, configured to, for each part hypothesis set, input voxelization information of all part hypotheses in the part hypothesis set into an identification model, and obtain a confidence score and a semantic category probability distribution for each part hypothesis, where the confidence score characterizes similarity information that the part hypothesis is similar with each semantic part, and the semantic category probability distribution characterizes a probability that the part hypothesis is attributable to each semantic part; and a constructing module 35, configured to construct, according to the confidence score and the semantic category probability distribution of each part hypothesis in the three part hypothesis sets, a high-order conditional random field model, and obtain a semantic category analysis result for each part in the three-dimensional model.

The apparatus for parsing and processing the three-dimensional model according to the present embodiment may perform the method for parsing and processing the three-dimensional model provided in the first embodiment of the present application, and implementation principles thereof are similar, thus details will not be repeated herein.

According to the present embodiment, perform aggregation processing on all components of a three-dimensional model via information about an adjacency relation between components in the three-dimensional model to generate three part hypothesis sets for the three-dimensional model; then, input voxelization information of all part hypotheses in the part hypothesis sets into a well-trained unified multi-scale convolutional neural network to obtain a confidence score and a semantic category probability distribution of each part hypothesis; and finally, obtain a semantic category analysis result for each component by using a high-order conditional random field model. Therefore, a new method for semantically parsing a three-dimensional CAD model is provided, which can parse and process a three-dimensional model having an "inner-external" structure with respect to its semantic category and has a good parsing effect. This method has strong robustness, which will not be affected by a topological structure of the model, a pose change or the like. Moreover, the method provided in the present embodiment is simple and effective, which does not require an interactive operation with a user but has a fast calculation speed.

Figure 11:
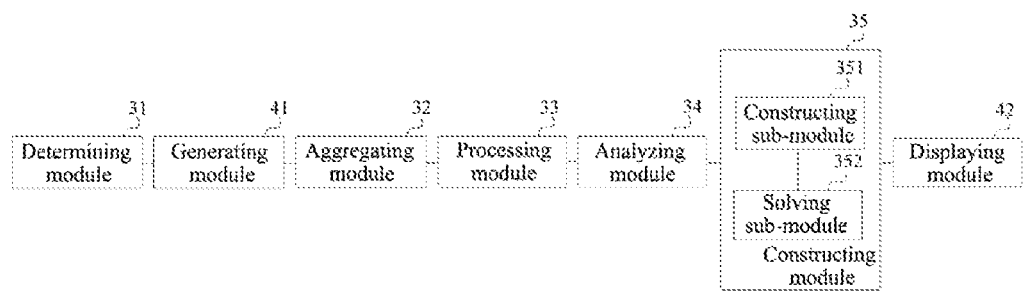
FIG. 11 is a schematic structural diagram of an apparatus for parsing and processing a three-dimensional model according to a fourth embodiment of the present application.

FIG. 11 is a schematic structural diagram of an apparatus for parsing and processing a three-dimensional model according to a fourth embodiment of the present application. Based on the third embodiment, as shown in FIG. 11, the apparatus provided in the present embodiment also includes:

a generating module 41, configured to: for each kind of adjacency relation information, generate a connected graph for the three-dimensional model according to the adjacency relation information after the determining module 31 determines the three kinds of adjacency relation information for each component in the three-dimensional model, where the connected graph includes a connection relationship between components of the three-dimensional model.

The constructing module 35 includes:

a constructing sub-module 351, configured to: for all part hypothesis sets, construct a high-order conditional random field model according to confidence scores and semantic category probability distributions of the part hypotheses, and obtain an energy function for the three-dimensional model; and a solving sub-module 352, configured to find an optimal solution of the obtained energy function by using an α-β moving algorithm, and obtain the semantic category analysis result for each component in the three-dimensional model.

The energy function is:

$$E(L) = \sum_{i=1}^{N} \varphi_i(x_i) + \lambda \sum_{h=1}^{H} \psi_h(h);$$

where $\varphi_i(x_i)$ is a data item, $\psi_h(h)$ is a high-order consistency item, $\lambda$ is used to tune the importance of $\varphi_i(x_i)$ and $\psi_h(h)$, $\lambda \in [0,1]$, N is a total number of all components of the three-dimensional model, H is a total number of all part hypotheses in all part hypothesis sets of the three-dimensional model, $i \in [1,N]$, $h \in [1,H]$, i, h, N and H are positive integers, $x_i$ is a random variable associated with the $i^{th}$ component;

$$\varphi_i(x_i) = -\log p(x_i, l_k),$$

$$p(x_i, l_k) = \left(\sum_{j=1}^{N} \exp(w_{ij} s_{ij} d_{ij,k})\right) \Bigg/ \left(\sum_{k=1}^{K} \sum_{j=1}^{N} \exp(w_{ij} s_{ij} d_{ij,k})\right),$$

$d_{ij,k}$ is a probability value that the $y_j^{th}$ part hypothesis takes the semantic category $l_k$, $s_{ij}$ is a confidence score of the $y_j^{th}$ part hypothesis, $w_{ij}$ is a ratio of a volume size of the $i^{th}$ component to a volume size of each part hypothesis, and K is a total number of semantic categories in a preset semantic category set, where the semantic category set is L= $\{l_1, \ldots, l_k, \ldots, l_K\}$, j∈[1,N], k∈[1,K], $y_j$∈[1,H], j, k, K and $y_j$ are positive integers;

$$\psi_h(h) = \begin{cases} N(x_h) \frac{1}{Q} \gamma_{max} & N(x_h) \le Q \\ \gamma_{max} & N(x_h) > Q \end{cases}, N(x_h) = \min_k(|h| - n_k(x_h)),$$

|h| is the number of components included in the $h^{th}$ part hypothesis, $n_k(x_h)$ is the number of components in the $h^{th}$ part hypothesis that are attributable to the semantic category $l_k$, Q is a preset truncation parameter, $\gamma_{max}=\exp(-1/|h|(\theta_1+\theta_2 G(h)))$, $\theta_1$ and $\theta_2$ are parameters set by a cross-validation, G(h) is a semantic category purity of the h part hypotheses, and $$G(y_j) = -\sum_{k=1}^{K} d_{ij,k} \ln d_{ij,k}.$$

The apparatus provided in the present embodiment also includes:

a displaying module 42, configured to: after the constructing module 35 constructs, according to the confidence score and the semantic category probability distribution of each part hypothesis in the three part hypothesis sets, the high-order conditional random field model, and obtains the semantic category analysis result for each component in the three-dimensional model, display the semantic category analysis result for each component in the three-dimensional model in a three-dimensional graphic display manner The apparatus for parsing and processing the three-dimensional model according to the present embodiment may perform the method for parsing and processing the three-dimensional model provided in the second embodiment of the present application, and implementation principles thereof are similar, thus details will not be repeated herein.

According to the present embodiment, perform aggregation processing on all components of a three-dimensional model via information about an adjacency relation between components in the three-dimensional model to generate three part hypothesis sets for the three-dimensional model; then, input voxelization information of all part hypotheses in the part hypothesis sets into a well-trained unified multi-scale convolutional neural network to obtain a confidence score and a semantic category probability distribution of each part hypothesis; and finally, obtain a semantic category analysis result for each component by using a high-order conditional random field model. Therefore, a new method for semantically parsing a three-dimensional CAD model is provided, which can parse and process a three-dimensional model having an "inner-external" structure with respect to its semantic category and has a good parsing effect. This method has strong robustness, which will not be affected by a topological structure of the model, a pose change or the like. Moreover, the method provided in the present embodiment is simple and effective, which does not require an interactive operation with a user but has a fast calculation speed. Furthermore, the sematic category analysis result for each component in the three-dimensional model may be displayed by using a three-dimensional graphic display manner, which thus facilitates the user to learn the parsing result.

Persons of ordinary skill in the art may understand that, all or a component of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc. It will be appreciated that the present disclosure is not limited to precise structures that have been described above and shown in the drawings. Moreover, various modifications and changes may be made without departing from the scope of the present disclosure. The scope of the present disclosure is only subject to the appended claims.

What is claimed is:

1. A method for parsing and processing a three-dimensional model, comprising:

determining three kinds of adjacency relation information for each component in the three-dimensional model, wherein the three kinds of adjacency relation information are respectively a center distance between each component and an adjacent component, a sum of volumes of each component and an adjacent component, and a contact area between each component and an adjacent component;

performing aggregation processing on all components of the three-dimensional model according to each kind of adjacency relation information respectively to generate three part hypothesis sets for the three-dimensional model, wherein each of the part hypothesis sets comprises at least one part hypothesis;

for each part hypothesis set, performing voxelization expression processing on each part hypothesis in the part hypothesis set, and generating voxelization information for each part hypothesis, wherein the voxelization information comprises local expression information, global expression information and remaining expression information;

for each part hypothesis set, inputting voxelization information of all part hypotheses in the part hypothesis set into an identification model, and obtaining a confidence score and a semantic category probability distribution for each part hypothesis, wherein the confidence score characterizes similarity information that the part hypothesis is similar with each semantic part, and the semantic category probability distribution characterizes a probability that the part hypothesis is attributable to each semantic part; and constructing, according to the confidence score and the semantic category probability distribution of each part hypothesis in the three part hypothesis sets, a high-order conditional random field model, and obtaining a semantic category analysis result for each component in the three-dimensional model.

2. The method according to claim 1, after the determining the three kinds of adjacency relation information for each component in the three-dimensional model, further comprising:

for each kind of adjacency relation information, generating a connected graph for the three-dimensional model according to the adjacency relation information, wherein the connected graph comprises a connection relationship between components of the three-dimensional model.

3. The method according to claim 1, wherein the constructing, according to the confidence score and the semantic category probability distribution of each part hypothesis in the three part hypothesis sets, the high-order conditional random field model, and the obtaining the semantic category analysis result for each component in the three-dimensional model comprise:

for all part hypothesis sets, constructing a high-order conditional random field model according to confidence scores and semantic category probability distributions of the part hypotheses, and obtaining an energy function for the three-dimensional model; and finding an optimal solution of the obtained energy function by using an α-β moving algorithm, and obtaining the semantic category analysis result for each component in the three-dimensional model.

4. The method according to claim 3, wherein the energy function is:

$$E(L) = \sum_{i=1}^{N} \varphi_i(x_i) + \lambda \sum_{h=1}^{H} \psi_h(h);$$

wherein $\varphi_i(x_i)$ is a data item, $\psi_h(h)$ is a high-order consistency item, $\lambda$ is a weight, $\lambda \in [0,1]$, N is a total number of all components of the three-dimensional model, H is a total number of all part hypotheses in all part hypothesis sets of the three-dimensional model, $i \in [1,N]$, $h \in [1,H]$, i, h, N and H are positive integers, $x_i$ is a random variable associated with the $i^{th}$ component;

$$\varphi_i(x_i) = -\log p(x_i, l_k),$$

$$p(x_i, l_k) = \left(\sum_{j=1}^{N} \exp(w_{ij} s_{ij} d_{ij,k})\right) \bigg/ \left(\sum_{k=1}^{K} \sum_{j=1}^{N} \exp(w_{ij} s_{ij} d_{ij,k})\right),$$

$d_{ij,k}$ is a probability value that the $y_j^{th}$ part hypothesis takes the semantic category $l_k$, $s_{ij}$ is a confidence score of the $y_j^{th}$ part hypothesis, $w_{ij}$ is a ratio of a volume size of the $i^{th}$ component to a volume size of each part hypothesis, and K is a total number of semantic categories in a preset semantic category set, wherein the semantic category set is $L = \{l_1, \ldots, l_k \ldots l_K\}$, $j \in [1,N]$, $k \in [1,K]$, $y_j \in [1,H]$, j, k, K and $y_j$ are positive integers;

$$\psi_h(h) = \begin{cases} N(x_h) \frac{1}{Q} \gamma_{max} & N(x_h) \leq Q \\ \gamma_{max} & N(x_h) > Q \end{cases}, N(x_h) = \min_k (|h| - n_k(x_h)),$$

$|h|$ is the number of components comprised in the $h^{th}$ part hypothesis, $n_k(x_h)$ is the number of components in the $h^{th}$ part hypothesis that are attributable to the semantic category $l_k$, Q is a preset truncation parameter, $\gamma_{max} = \exp(-1/|h|(\theta_1 + \theta_2 G(h)))$, $\theta_1$ and $\theta_2$ are parameters set by a cross-validation, $G(h)$ is a semantic category purity of the h part hypotheses, and $$G(y_j) = -\sum_{k=1}^{K} d_{ij,k} \ln d_{ij,k}.$$

5. The method according to claim 1, after the constructing, according to the confidence score and the semantic category probability distribution of each part hypothesis in the three part hypothesis sets, the high-order conditional random field model, and the obtaining the semantic category analysis result for each component in the three-dimensional model, further comprising:

displaying the semantic category analysis result for each component in the three-dimensional model in a three-dimensional graphic display manner.

6. An apparatus for parsing and processing a three-dimensional model, comprising:

a determining module, configured to determine three kinds of adjacency relation information for each component in the three-dimensional model, wherein the three kinds of adjacency relation information are respectively a center distance between each component and an adjacent component, a sum of volumes of each component and an adjacent component, and a contact area between each component and an adjacent component;

an aggregating module, configured to perform aggregation processing on all components of the three-dimensional model according to each kind of adjacency relation information respectively to generate three part hypothesis sets for the three-dimensional model, wherein each of the part hypothesis sets comprises at least one part hypothesis;

a processing module, configured to, for each part hypothesis set, perform voxelization expression processing on each part hypothesis in the part hypothesis set, and generate voxelization information for each part hypothesis, wherein the voxelization information comprises local expression information, global expression information and remaining expression information;

an analyzing module, configured to: for each part hypothesis set, input voxelization information of all part hypotheses in the part hypothesis set into an identification model, and obtain a confidence score and a semantic category probability distribution for each part hypothesis, wherein the confidence score characterizes similarity information that the part hypothesis is similar with each semantic part, and the semantic category probability distribution characterizes a probability that the part hypothesis is attributable to each semantic part; and a constructing module, configured to construct, according to the confidence score and the semantic category probability distribution of each part hypothesis in the three part hypothesis sets, a high-order conditional random field model, and obtain a semantic category analysis result for each component in the three-dimensional model.

7. The apparatus according to claim 6, wherein the apparatus further comprises:

a generating module, configured to: for each kind of adjacency relation information, generate a connected graph for the three-dimensional model according to the adjacency relation information after the determining module determines the three kinds of adjacency relation information for each component in the three-dimensional model, wherein the connected graph comprises a connection relationship between components of the three-dimensional model.

8. The apparatus according to claim 6, wherein the constructing module comprises:
a constructing sub-module, configured to: for all part hypothesis sets, construct a high-order conditional random field model according to confidence scores and semantic category probability distributions of the part hypotheses, and obtain an energy function for the three-dimensional model; and
a solving sub-module, configured to find an optimal solution of the obtained energy function by using an α-β moving algorithm, and obtain the semantic category analysis result for each component in the three-dimensional model.

9. The apparatus according to claim 8, wherein the energy function is:

$$E(L) = \sum_{i=1}^{N} \varphi_i(x_i) + \lambda \sum_{h=1}^{H} \psi_h(h);$$

wherein $\varphi_i(x_i)$ is a data item, $\psi_k(h)$ is a high-order consistency item, is a weight, $\lambda \in [0,1]$, N is a total number of all components of the three-dimensional model, H is a total number of all part hypotheses in all part hypothesis sets of the three-dimensional model, $i \in [1,N]$, $h \in [1,H]$, i, h, N and H are positive integers, $x_i$ is a random variable associated with the $i^{th}$ component;

$$\varphi_i(x_i) = -\log p(x_i, l_k),$$

$$p(x_i, l_k) = \left(\sum_{j=1}^{N} \exp(w_{ij} s_{ij} d_{ij,k})\right) \bigg/ \left(\sum_{k=1}^{K} \sum_{j=1}^{N} \exp(w_{ij} s_{ij} d_{ij,k})\right),$$

$d_{ij,k}$ is a probability value that the $y_j^{th}$ part hypothesis takes the semantic category $l_k$, $s_{ij}$ is a confidence score of the $y_j^{th}$ part hypothesis, $w_{ij}$ is a ratio of a volume size of the $i^{th}$ component to a volume size of each part hypothesis, and K is a total number of semantic categories in a preset semantic category set, wherein the semantic category set is $L = \{l_1, \ldots, l_k, \ldots, l_K\}$, $j \in [1, N]$, $k \in [1,K]$, $y_j \in [1,H]$, j, k, K and $y_j$ are positive integers;

$$\psi_h(h) = \begin{cases} N(x_h) \frac{1}{Q} \gamma_{max} & N(x_h) \leq Q \\ \gamma_{max} & N(x_h) > Q \end{cases}, N(x_h) = \min_k (|h| - n_k(x_h)),$$

$|h|$ is the number of components comprised in the $h^{th}$ part hypothesis, $n_k(x_h)$ is the number of components in the $h^{th}$ part hypothesis that are attributable to the semantic category $l_k$, Q is a preset truncation parameter, $\gamma_{max} = \exp(-1/|h|(\theta_1 + \theta_2 G(h)))$, $\theta_1$ and $\theta_2$ are parameters set by a cross-validation, G(h) is a semantic category purity of the h part hypotheses, and $$G(y_j) = -\sum_{k=1}^{K} d_{ij,k} \ln d_{ij,k}.$$

10. The apparatus according to claim 6, wherein the apparatus further comprises:
a displaying module, configured to: after the constructing module constructs, according to the confidence score and the semantic category probability distribution of each part hypothesis in the three part hypothesis sets, the high-order conditional random field model, and obtains the semantic category analysis result for each component in the three-dimensional model, display the semantic category analysis result for each component in the three-dimensional model in a three-dimensional graphic display manner.

* * * * *